(12) United States Patent
Furlong et al.

(10) Patent No.: US 11,378,362 B2
(45) Date of Patent: Jul. 5, 2022

(54) COUNTER UAV DRONE SYSTEM USING ELECTROMAGNETIC PULSE

(71) Applicant: The United States of America, as represented by the Secretary of the Navy, Crane, IN (US)

(72) Inventors: Steven C. Furlong, Bloomington, IN (US); Timothy M. Lang, Bloomington, IN (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 22 days.

(21) Appl. No.: 16/875,149

(22) Filed: May 15, 2020

(65) Prior Publication Data

US 2020/0363167 A1   Nov. 19, 2020

Related U.S. Application Data

(60) Provisional application No. 62/849,312, filed on May 17, 2019.

(51) Int. Cl.
| | |
|---|---|
| *F41H 13/00* | (2006.01) |
| *F41H 11/02* | (2006.01) |
| *G05D 1/00* | (2006.01) |
| *B64C 39/02* | (2006.01) |

(52) U.S. Cl.
CPC ....... *F41H 13/0093* (2013.01); *B64C 39/024* (2013.01); *F41H 11/02* (2013.01); *G05D 1/0016* (2013.01); *B64C 2201/121* (2013.01); *B64C 2201/146* (2013.01)

(58) Field of Classification Search
CPC ............... F41H 13/0093; F41H 11/02; B64C 2201/121; B64C 2201/146; B64C 39/024; G05D 1/0011; G05D 1/0016
See application file for complete search history.

(56) References Cited

U.S. PATENT DOCUMENTS

| | | | |
|---|---|---|---|
| 9,127,908 B2 * | 9/2015 | Miralles | F41G 7/2293 |
| 9,211,947 B2 * | 12/2015 | Miralles | B64C 39/024 |
| 9,658,044 B2 * | 5/2017 | Bonbrake | F42C 11/04 |
| 9,896,221 B1 | 2/2018 | Kilian et al. | |
| 10,088,278 B1 * | 10/2018 | Tanielian | F41H 13/0093 |
| 10,962,335 B2 * | 3/2021 | Holihan | F41H 11/02 |
| 11,040,772 B2 * | 6/2021 | Reddy | G05D 1/0027 |
| 2016/0023760 A1 | 1/2016 | Goodrich | |
| 2019/0195601 A1 * | 6/2019 | Finkenberg | F42B 12/208 |

* cited by examiner

*Primary Examiner* — Joshua T Semick
(74) *Attorney, Agent, or Firm* — Naval Surface Warfare Center, Crane Division; Eric VanWiltenburg

(57) ABSTRACT

In general, the present invention is directed to airborne security measures and more specifically to a device and method to defeat in total a plurality of approaching Unmanned Aerial Vehicles (UAVs) with a single sacrificial intercepting drone. In a preferred embodiment of the invention the intercepting drone may be configured with an attached Electro-Magnetic Pulse (EMP) generation device capable of producing a sufficiently intense EMP burst to completely disable all approaching UAVs.

12 Claims, 8 Drawing Sheets

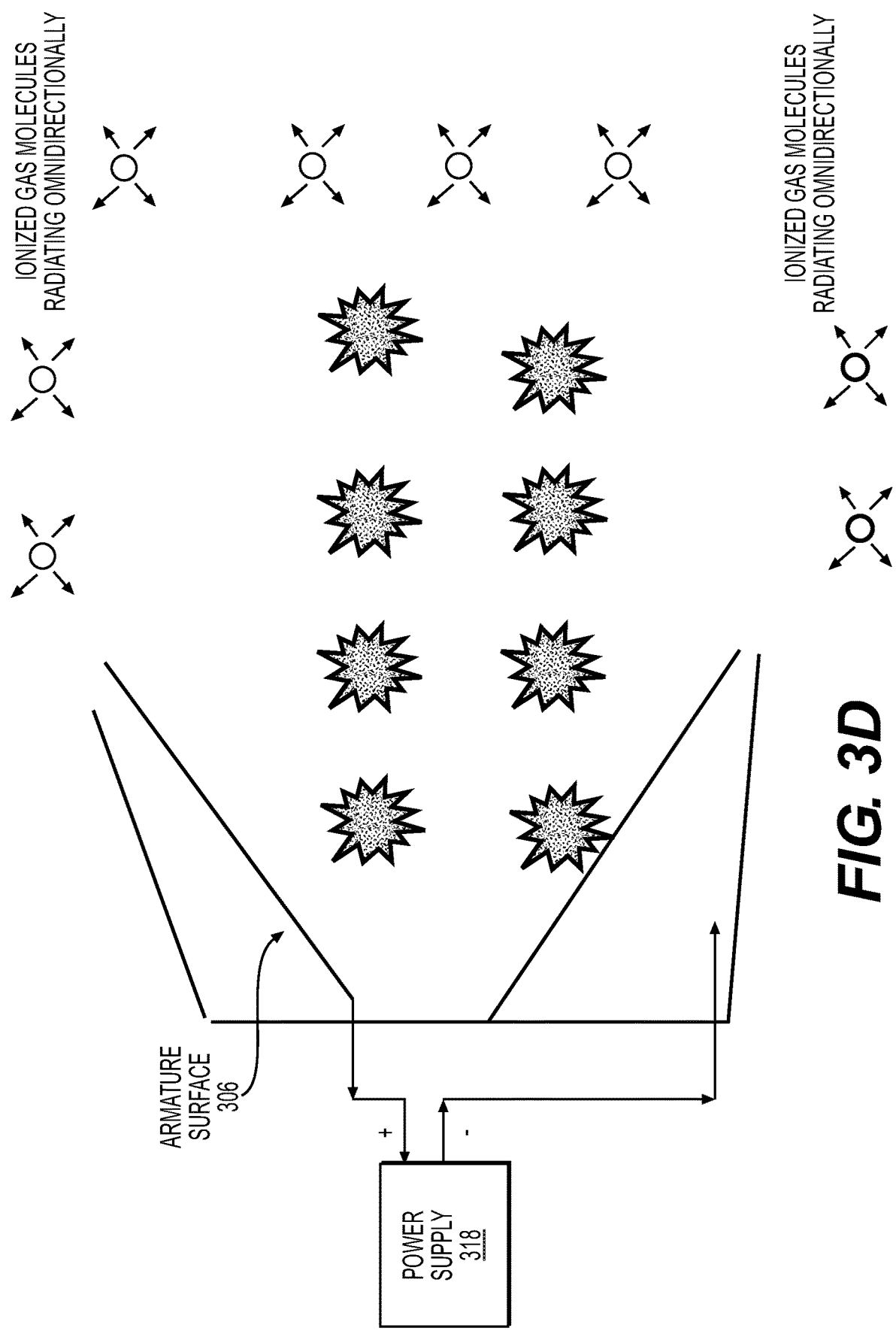

"EMP DRAFTING"

COUNTER UAV DRONE SYSTEM USING ELECTROMAGNETIC PULSE

CROSS REFERENCE TO RELATED APPLICATIONS

This application claims priority to U.S. Provisional Application Ser. No. 62/849,312 filed on May 17, 2019, the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,611) is assigned to the United States Government and is available for licensing for commercial purposes. Licensing and technical inquiries may be directed to the Technology Transfer Office, Naval Surface Warfare Center, Crane Division, email: Cran_CTO@navy.mil.

FIELD OF THE INVENTION

The present invention relates to an Unmanned Aerial Vehicle (UAV) with an attached Electro-Magnetic Pulse (EMP) generation device capable of disabling all approaching UAVs.

BACKGROUND

Today, UAVs are ubiquitous in the commercial market place. They can be equipped with a wide variety of tools and features to enable a diverse set of functionality. As drone technology becomes more sophisticated and the costs of such drones decreases, the use of drones will continue to increase. Troublemakers can attempt to disrupt events or places of business by operating a large number of drones which can bypass or overwhelm security measures.

Attempts have been made to counter UAVs. U.S. Pat. No. 9,896,221 proposes a device and method to defeat approaching drones by a capturing UAV with a deployable net attached to the fuselage of the UAV. The net may be deployed from (and remain attached to) the UAV fuselage via a mechanical structure with the goal of "ensnarling" the approaching UAV in the net. A similar approach to the 221' patent, a net attached to the capturing UAV, can be found in U.S. Patent Application 2016/0023760466466.

Although there exist solutions for dealing with single UAVs or multiple close UAVs, there still exists a need for a device and method to disable/destroy a plurality of UAVs disbursed over a wide expanse (e.g., across an airport). The present invention addresses this need.

SUMMARY OF THE INVENTION

In general, the present invention is directed to airborne security measures and more specifically to a device and method to defeat in total a plurality of approaching Unmanned Aerial Vehicles (UAVs) with a single sacrificial intercepting drone. The invention discloses attaching an Electro Magnetic Pulse (EMP) generating device to a sacrificial interceptor UAV and via remote pilot wireless control, flying the said interceptor UAV into the centroid of the attacking "swarm" and activating the EMP generating device with the goal of disabling or possibly destroying the onboard electronics in the approaching UAVs by way of the following effect.

Electronic devices, especially computer based devices, are particularly vulnerable to EMP effects, as they are largely composed of high density Metal Oxide Semiconductor (MOS) devices, which are very sensitive to exposure to high voltage transients. What is significant about MOS devices is that very little energy is required to permanently wound or destroy them, any voltage typically in excess of 10 Volts can produce an effect termed gate breakdown which effectively destroys the device. Even if the pulse itself is not powerful enough to produce total destructive damage, the power supply in the equipment will readily supply enough energy to complete the destructive process. Wounded devices may still function, but their reliability will be seriously impaired. Shielding electronics by equipment chassis provides only limited protection, as any cables running in and out of the equipment will function as an antenna, in effect guiding the high voltage transients into the equipment.

Other electronic devices and electrical equipment may also be destroyed by the EMP effect. Telecommunications equipment can be highly vulnerable, due to the presence of copper leads/cables between devices. Receivers of all varieties are particularly sensitive to EMP, as the highly sensitive miniature high frequency transistors and diodes in such equipment are easily destroyed by exposure to high voltage electrical transients. Therefore, radar and electronic equipment, satellite, microwave, UHF, VHF, HF and low band communications equipment and video equipment are all potentially vulnerable to the EMP effect. Given this, the activation of the interceptor UAV EMP generating device may also interrupt, or completely destroy, any wireless communication from a remote pilot commanding the incoming swarm.

A preferred embodiment of the present invention describes an interceptor UAV for simultaneously disabling a plurality of incoming UAVs comprising a generally cylindrical fuselage, a propulsion system, the said propulsion system including a means to power at least one propeller, at least one control surface, a guidance system in mechanical communication with the at least one control surface, the said guidance system in wireless communication and responsive to wireless commands received from a remote pilot, an electro-magnetic pulse generating device attached to the generally cylindrical fuselage, and a means to activate the said electro-magnetic pulse generating device.

BRIEF DESCRIPTION OF THE DRAWINGS

The invention may be more completely understood in consideration of the following detailed description of various embodiments of the invention in connection with the accompanying drawings, in which:

FIG. 3D shows ionized gas molecules releasing an omnidirectional electromagnetic burst from the compressed time varying magnetic field.

Figure 1:
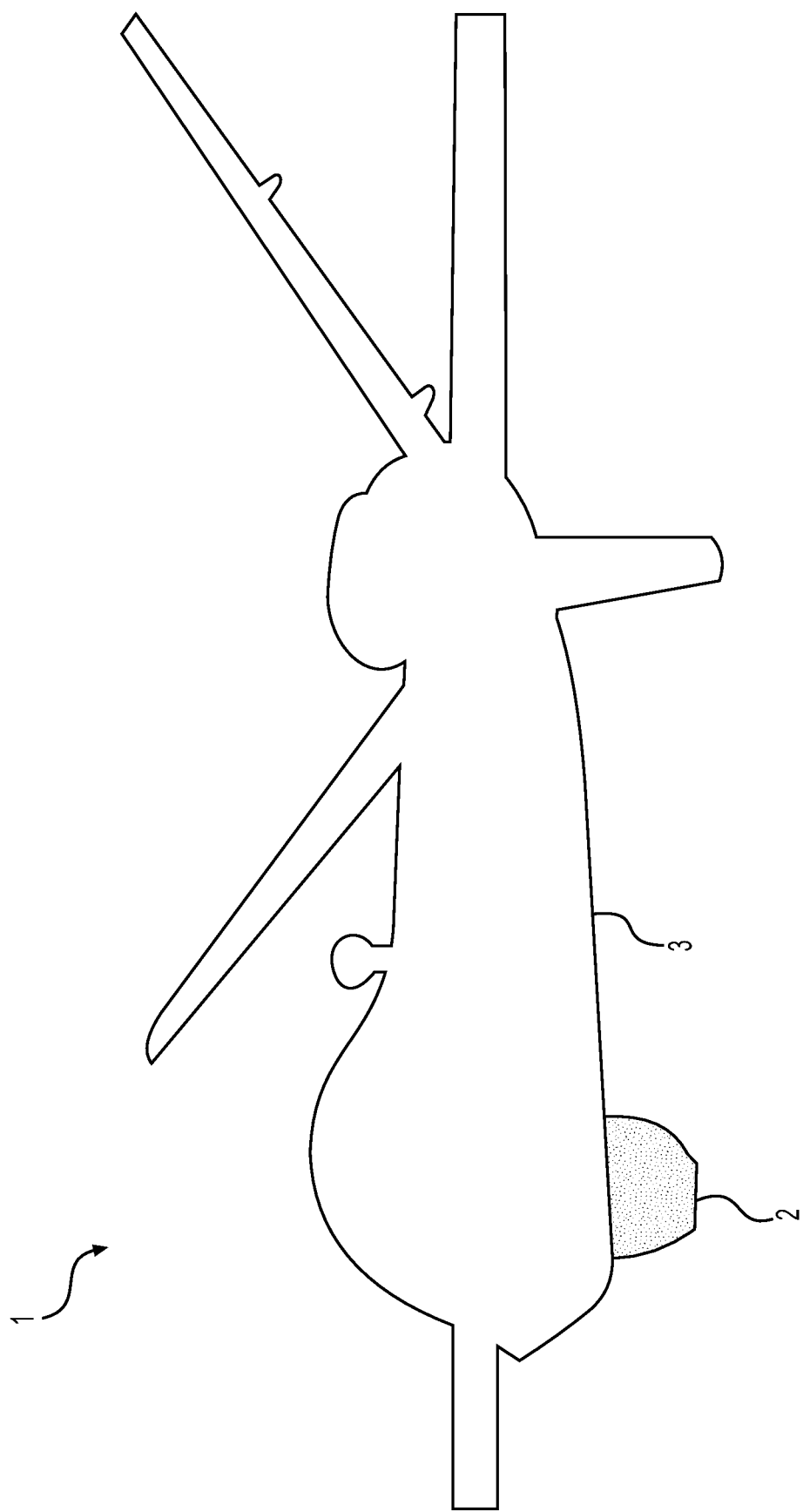
FIG. 1 shows a schematic representation of one embodiment of the present invention depicting an unmanned aerial vehicle (UAV) with an attached electromagnetic pulse generating device attached to the UAV fuselage.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In general, the present invention is directed to airborne security measures and more specifically to a device and method to defeat in total a plurality of approaching Unmanned Aerial Vehicles (UAVs) with a single sacrificial intercepting drone. In a preferred embodiment of the invention the intercepting drone may be configured with an attached Electro-Magnetic Pulse (EMP) generating device capable of producing a sufficiently intense EMP burst to completely disable all approaching UAVs.

One embodiment of the present invention is shown in FIG. 1 depicting an unmanned aerial vehicle (UAV) 1 with an Electro-Magnetic Pulse (EMP) generating device 2 attached to the UAV's fuselage region 3. The UAV may be configured with the necessary hardware (not shown) to receive wireless communication commands from a remote pilot to both navigate the UAV and detonate the EMP device.

Figure 2:
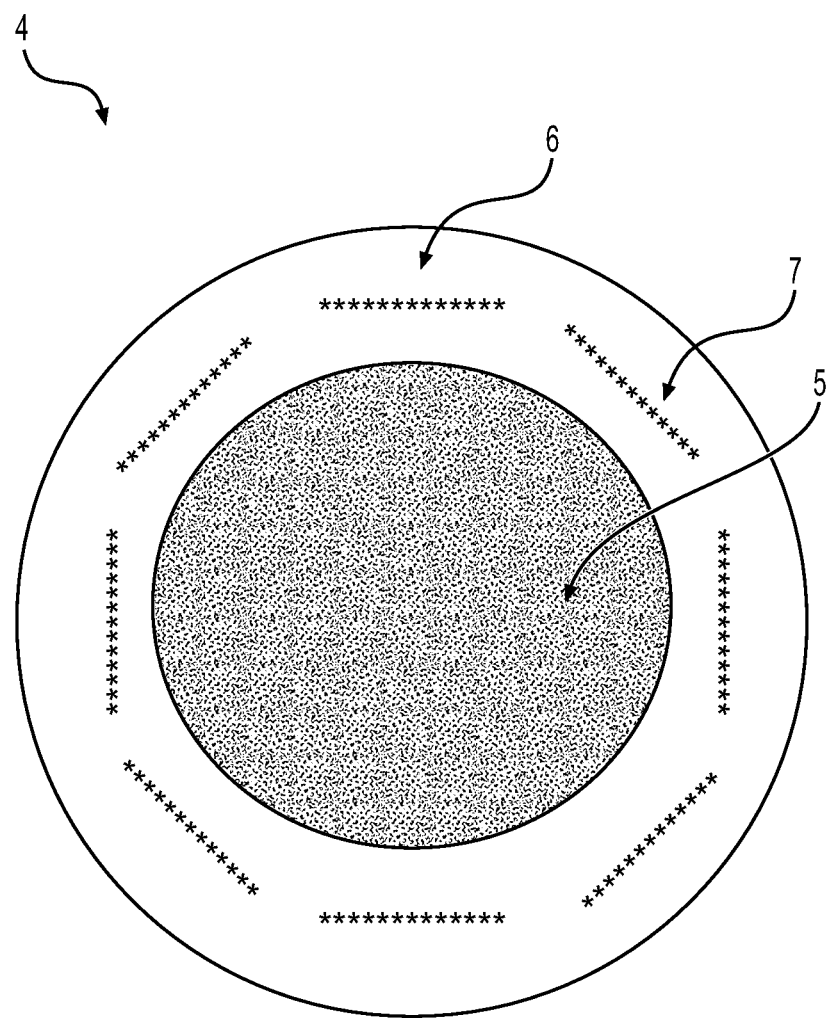
FIG. 2 shows a cross sectional representation of one embodiment of the present invention depicting the electromagnetic pulse generating device shown in FIG. 1.

FIG. 2 shows a cross sectional view of one embodiment of the Electro-Magnetic Pulse (EMP) generating device depicted in FIG. 1. The EMP generating device 4 may be comprised of a centrally located explosive material 5, surface wrapped with a host material 6. The host material 6 may encase charged particles 7 from the family of alkali metals including lithium ions, cesium ions, potassium ions or a combination thereof. One example in the prior art, U.S. Pat. No. 10,088,278 teaches utilizing intercalated graphite as the host material 6 to encase the charged particle 7 ions, and the 278' patent is incorporated herein by reference in its entirety. The centrally located highly explosive material 5 may have an integrated detonator device 8, which may be configured to receive a wireless command from the remote UAV pilot to initiate detonation of the highly explosive material.

Upon detonation, the encased ions 7 may be liberated from their host material 6, and under extreme acceleration may generate an intense Electro-Magnetic Pulse (EMP). Given the spherical geometry of the EMP generating device 4, the radiated EMP pulse may propagate radially outward, and may disable or destroy all incoming UAV's within a certain distance.

Figure 3:
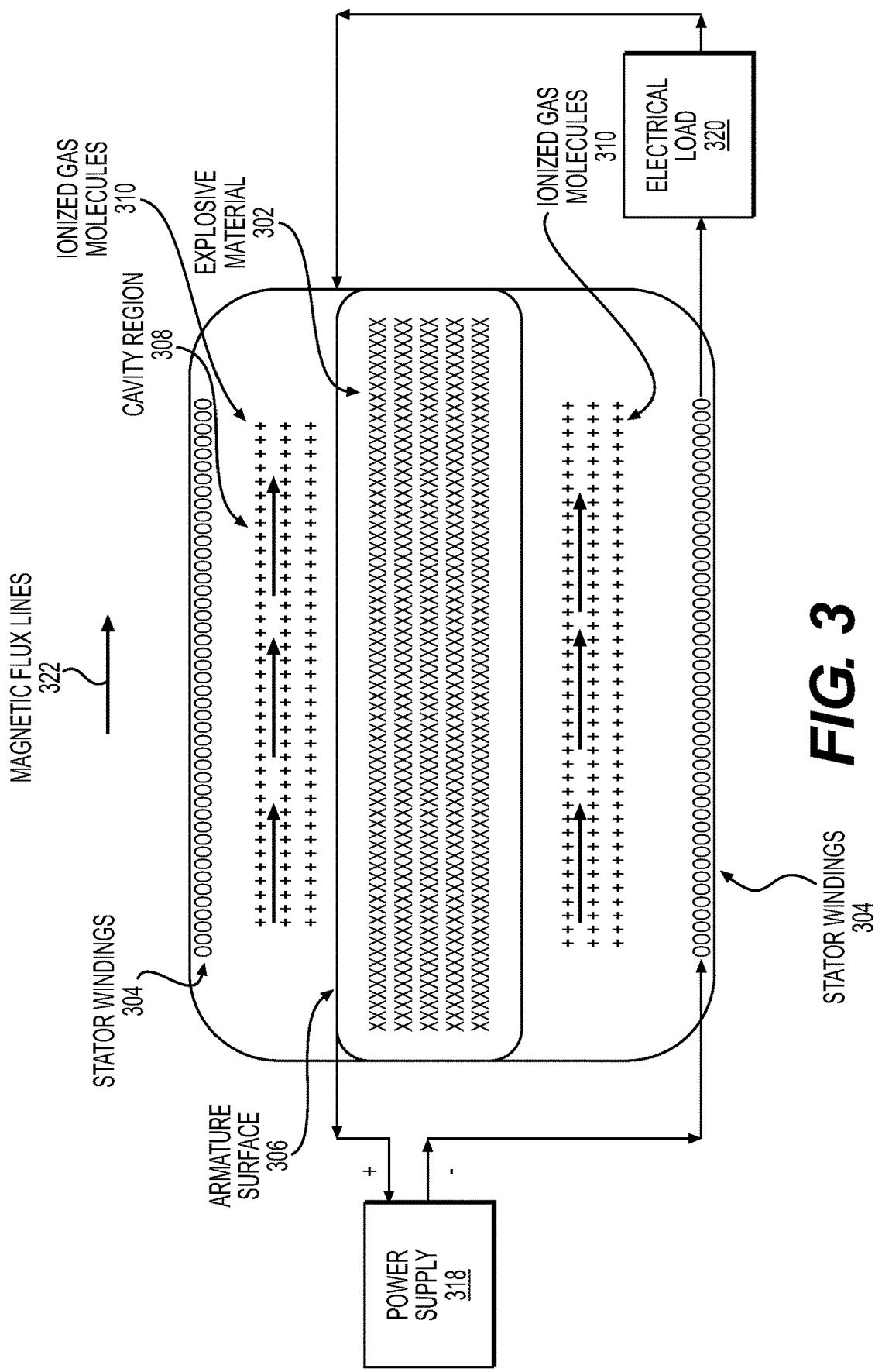
FIG. 3 shows a schematic representation of an alternative embodiment of the electromagnetic pulse generating device, wherein the device is configured as an explosively pumped modified flux compression generator.

A preferred embodiment of the present invention is depicted in FIG. 3, wherein devices of this general configuration have been coined in the technical literature as Flux Compression Generators (FCGs). One such prior art device can be found in U.S. Pat. No. 9,658,026 by inventors Fred Grace et al. The 026' patent teaches a particular configuration of a FCG device configured to explosively generate a linearly propagating highly compressed magnetic field, which in turn can generate enormous electrical currents, the net result of which claims to have the ability to launch an extremely high velocity projectile. However, the goal of the present invention is to generate an omnidirectional, radially expanding high intensity electromagnetic pulse as explained earlier.

FIG. 3 shows a cross sectional view of an explosively pumped Flux Compression Generator (FCG) 300 in accordance with the present invention. The main feature of the FCG includes a centrally located high velocity explosive material 302 which is encased in a conducting cylindrical housing which functions as an electrical armature surface 306. Candidate high velocity explosive material may include but are not limited to PETN (Pentaerythritoltetranitrate), TATP, (Triacetone triperoxide), RDX (Cyclotrimethylene trinitramine), and TNT amongst others. The entire device may be surrounded by an outer cylindrical surface of revolution 305 which may have electrically conducting stator windings 304 sequentially wound and adhered to its' inner surface. The outer surface 305 may form an air tight seal for the overall Flux Compression Generator (FCG) 300 with the appropriate air tight through-hole apertures to allow passage of electrical leads into and out of the outer surface 305. Also, the outer surface 305 may have an pneumatic adapter 307 to allow pressurizing the cavity region 308. In a preferred embodiment of the invention, the pneumatic adapter 307 may be utilized to inject ionized lithium gas molecules 310 into the cavity region 308.

The outer surface 305 may be segmented along its cylindrical length such that the proximal end of the said material may withstand intact the detonation of the explosive material and the distal end may be designed to disintegrate under pressure from the explosion.

In operation, an electrical power source 318 negative terminal may be connected to the proximal end of the conducting stator 304 and the positive terminal may be connected to the proximal end of the conducting armature 306 as depicted in FIG. 3. An electrical resistive load 320 may be connected between the distal ends of the conducting stator and armature, thereby establishing a closed loop circuit from the power supply through the stator to the load, back through the armature to the power supply. Prior to detonating the high velocity explosive material, the power supply 318 may be energized thereby establishing an initial nominal magnetic field 322 oriented in a longitudinal direction throughout the cavity region 308 filled with ionized gas molecules 310.

Figure 3A:
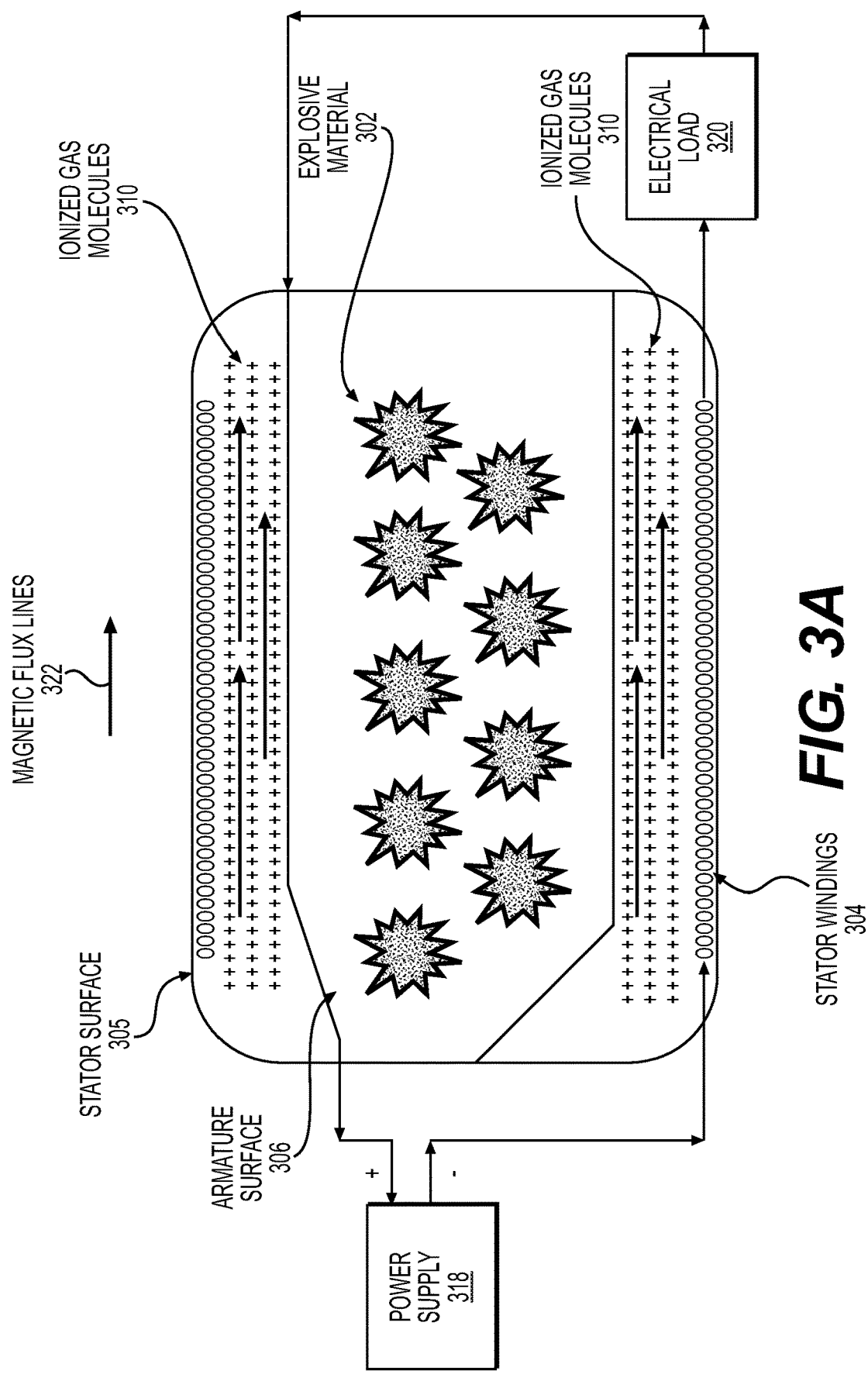
FIG. 3A depicts the electromagnetic pulse generating device immediately upon detonating the high velocity explosive material, wherein the explosive force begins deforming the armature surface outwardly toward the stator surface.
Figure 3B:
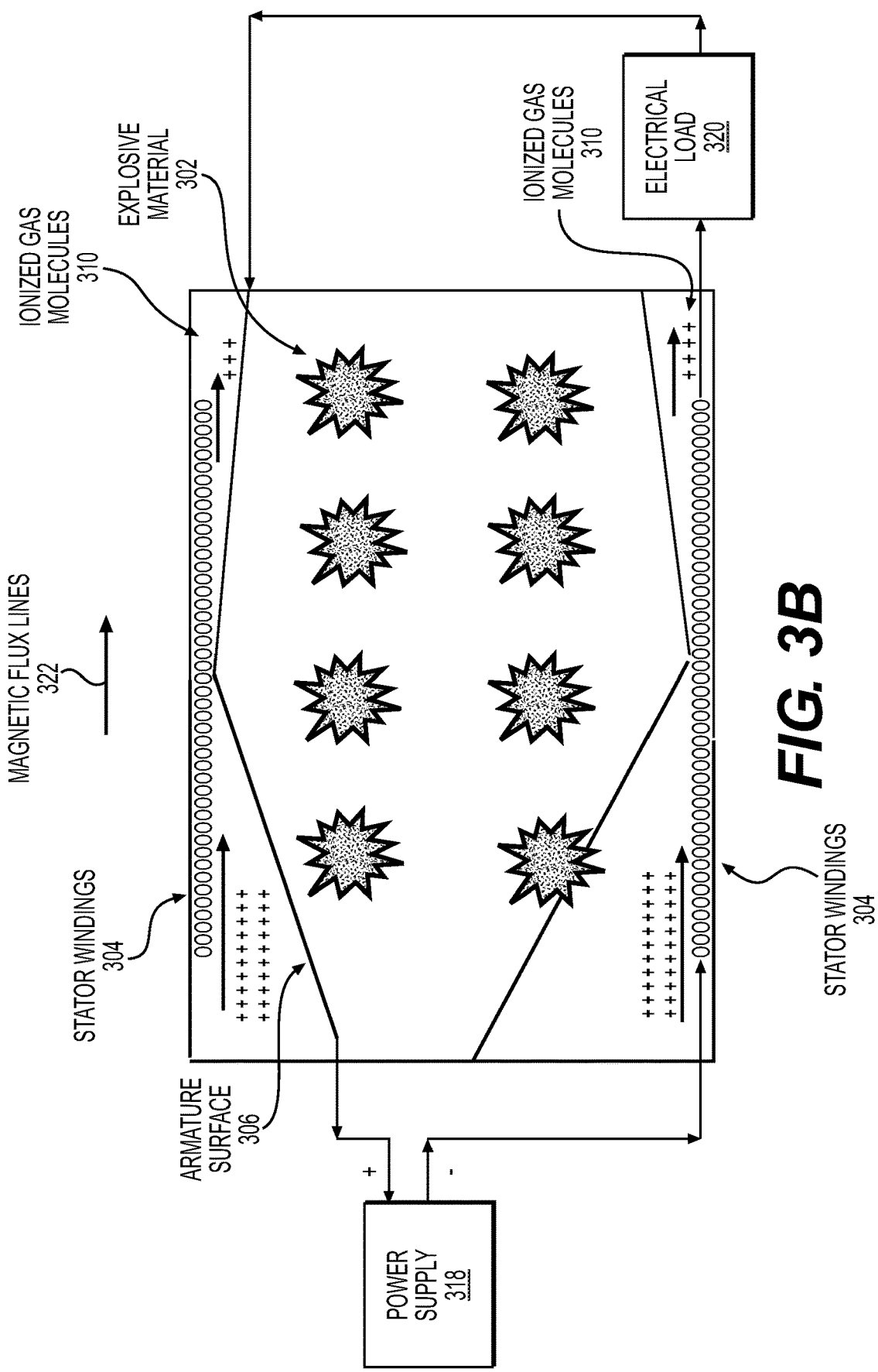
FIG. 3B depicts the electromagnetic pulse generating device approximately 10 microseconds after detonating the explosive material wherein the outwardly deforming armature surface first contacts the stator windings.

Immediately upon detonating the high velocity explosive material 302, the explosive force begins deforming the armature surface 306 outwardly toward the stator surface 305 as depicted in FIG. 3A, thereby greatly compressing/strengthening the magnetic field lines 322 and rapidly accelerating the ionized gas molecules 320 in the now reduced cavity region 308. Now, waiting approximately 10 milliseconds such that simultaneous with the outwardly deforming armature surface 306 contacting the stator windings 304 as depicted in FIG. 3B, short circuiting the load resistance 320 and maximizing the current available from the power supply 318 through the stator windings 304 thereby increasing the magnetic field strength 322 in the cavity region 308. The now high velocity charged particles 310 interact with the greatly increased magnetic field strength 322 by way of the Lorentz Force given by the vector cross product equation Lorentz Force=Velocity×Magnetic Field Strength, the net result being an additional rapid acceleration of the ionized particles—generating an enormous electro-magnetic pulse possibly in the terawatt regime.

Figure 3C:
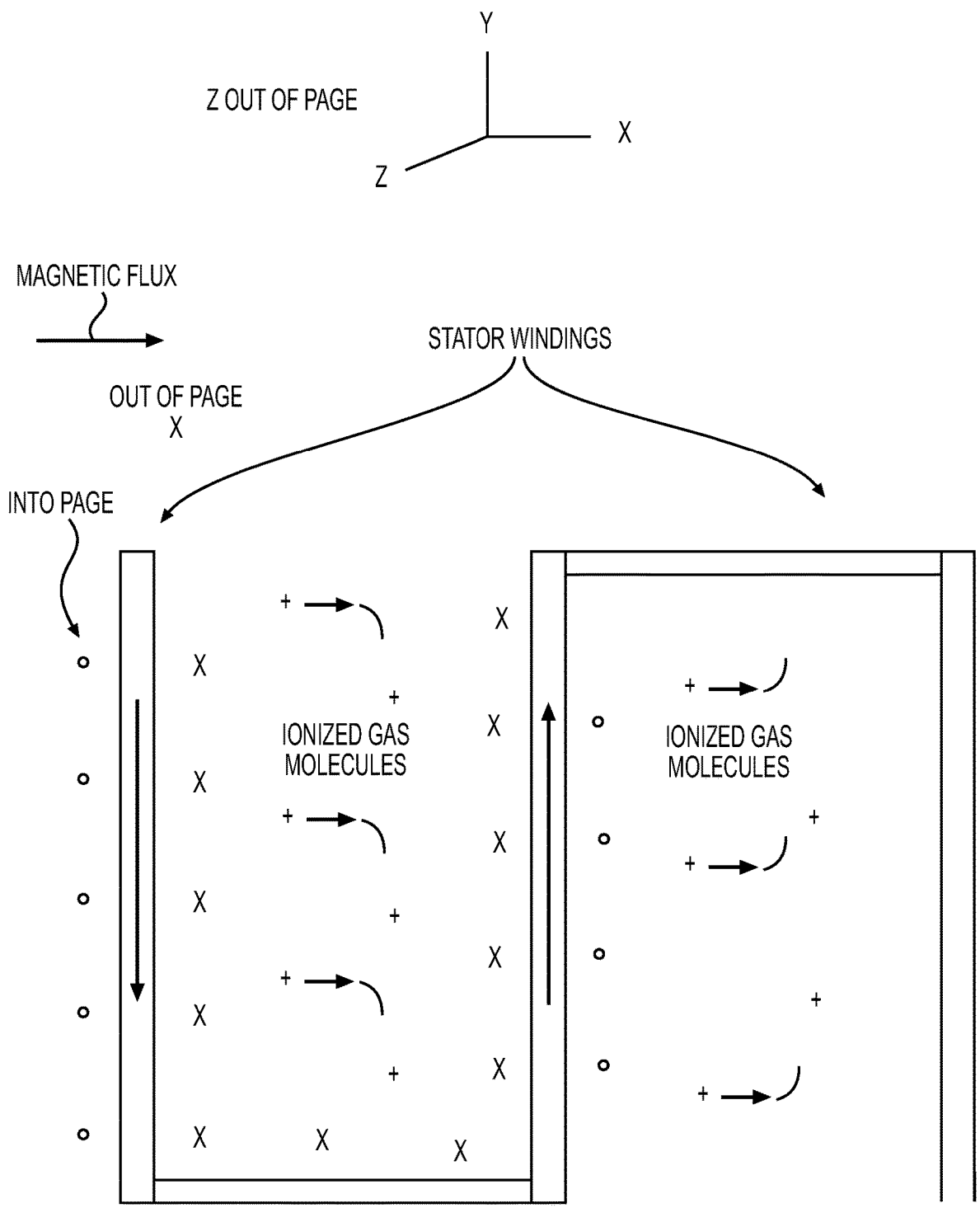
FIG. 3C depicts the electromagnetic pulse generating device when the explosive force has propagated longitudinally a predetermined distance toward the distal end of the device which disintegrates thereby releasing the accelerating ionized gas molecules.
Figure 3E:
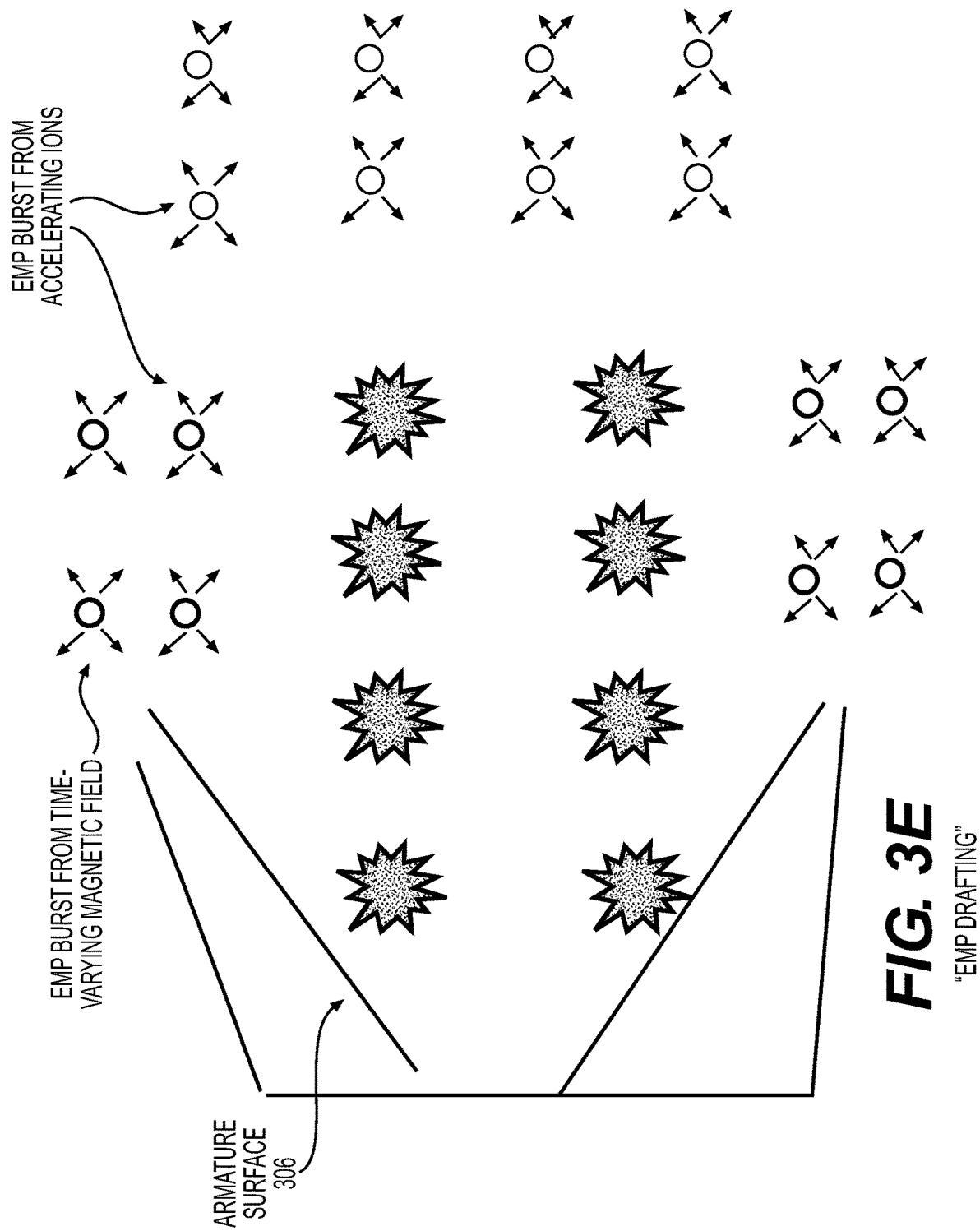
FIG. 3E shows an omnidirectional electromagnetic burst from the released rapidly accelerating ionized gas molecules.

Shortly thereafter (millisecond time frame), when the explosive force has propagated a predetermined distance toward the distal end of the outer coaxial cylindrical shell, designed to disintegrate under radial pressure, the outer shell material will disintegrate as depicted in FIG. 3C, thereby releasing an omnidirectional electromagnetic burst from the compressed time varying magnetic field 322 (FIG. 3D) and an omnidirectional electromagnetic burst from the released rapidly accelerating ionized gas molecules 310 (FIG. 3E).

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An interceptor UAV for simultaneously disabling a plurality of incoming UAVs comprising:
   a generally cylindrical fuselage;
   a propulsion system;
   said propulsion system including a means to power at least one propeller;
   at least one control surface;
   a guidance system in mechanical communication with the at least one control surface;
   the said guidance system in wireless communication and responsive to wireless commands received from a remote pilot;
   an electro-magnetic pulse generating device in mechanical communication with the generally cylindrical fuselage;
   wherein the electro-magnetic pulse generating device comprises an explosively pumped flux compression generator:
   wherein the flux compression generator comprises a central cylindrical shell acting electrically as a conducting armature, an explosive material filling the central cylindrical shell, a cavity between the armature and an outer metallic shell that acts as a conducting stator, said cavity filled with ionized gas molecules, a detonator in the explosive material, and an outer surface surrounding the electro-magnetic pulse generating device and forming a seal of the cavity region between said stator and armature, the outer surface comprising through-hole apertures configured to allow passage of electrical leads into and out of the outer surface while maintaining said seal; and
   a wireless communication means to activate said electro-magnetic pulse generating device.

2. The device of claim 1 wherein the electro-magnetic pulse generating device may be remotely activated via a wireless communication command from the remote pilot.

3. The device of claim 1 wherein the electro-magnetic pulse generating device is in releasable mechanical communication from the generally cylindrical fuselage via a wireless command from the remote pilot.

4. The device of claim 3 wherein the released electro-magnetic pulse generating device may be remotely activated via a wireless communication command from the remote pilot.

5. The device of claim 1 wherein the electro-magnetic pulse generating device comprises a host material encapsulating electrically charged particles; said host material surface coating an explosive material.

6. The device of claim 5 wherein the detonator can be wirelessly activated.

7. The device of claim 6 wherein activating the detonator and exploding the explosive material liberates and accelerates the charged particles from the host material thereby generating an intense electro-magnetic wave/pulse.

8. The device of claim 1 wherein when current is supplied to the said stator an initial magnetic field between the stator and the said armature is established.

9. The device of claim 1 wherein a proximal end of the stator incorporates a hardened outer surface capable of surviving intact the explosion of the explosive material.

10. The device of claim 9 wherein upon detonating the explosive material, the said hardened outer surface at the proximal end of the armature directs the explosive wave toward a distal end of the electro-magnetic pulse generating device.

11. The device of claim 10 wherein the propagating explosive wave causes the armature surface to radially expand thereby simultaneously compressing the magnetic field lines and rapidly accelerating the ionized gas molecules in the cavity region.

12. The device of claim 11 where at a predetermined distance from the distal end of the electro-magnetic pulse generating device, the armature surface and stator, now in close proximity thereby generating both a compressed magnetic field and a pressurized ionized gas, is designed to disintegrate under radial pressure and release an omnidirectional electro-magnetic wave/pulse.

* * * * *